Jan. 31, 1967　　C. D. WAYNE ETAL　　3,301,378
FOOD HANDLING APPARATUS

Filed April 3, 1964　　　　　　　　　　　　4 Sheets-Sheet 1

Inventors
CLYDE D. WAYNE
HERBERT C. ZECK
By Anderson, Luedeka, Fitch, Even & Tabin
Atty's

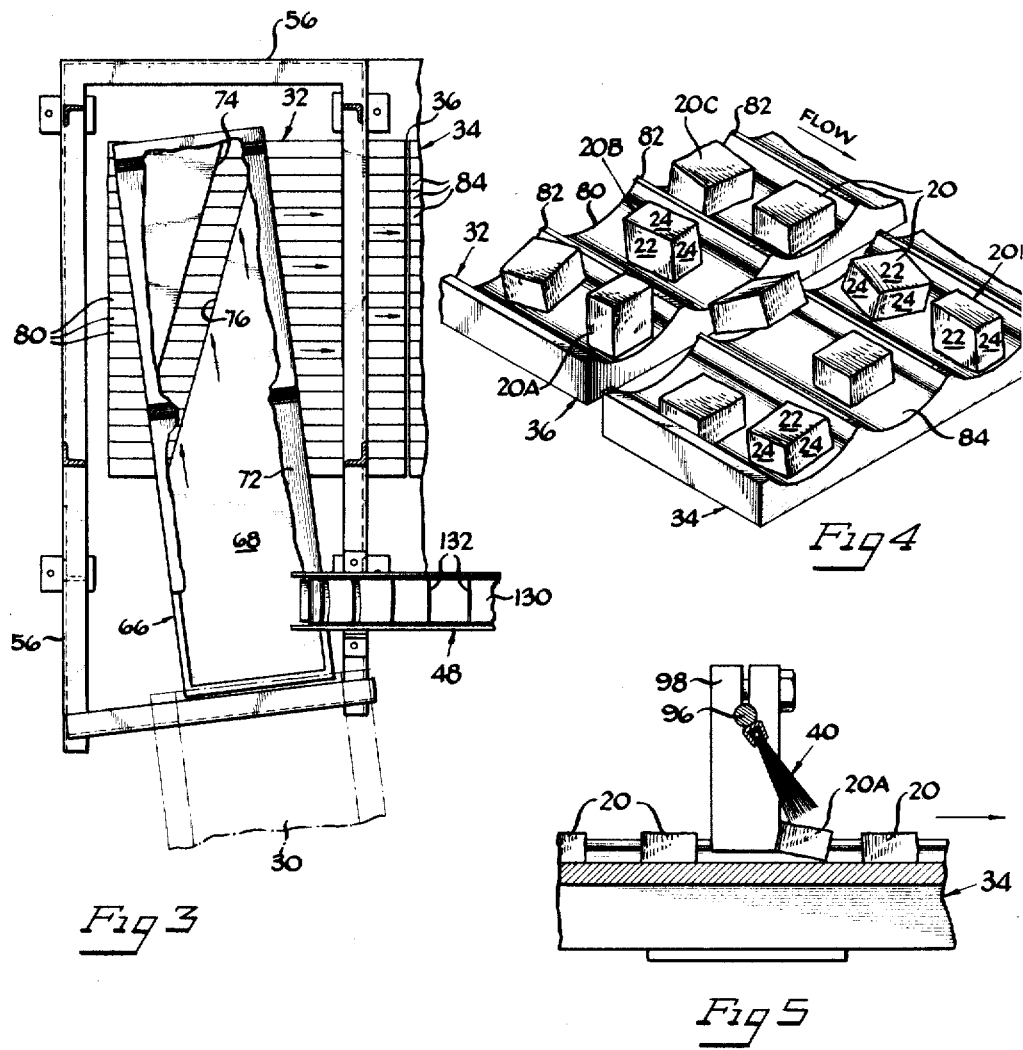

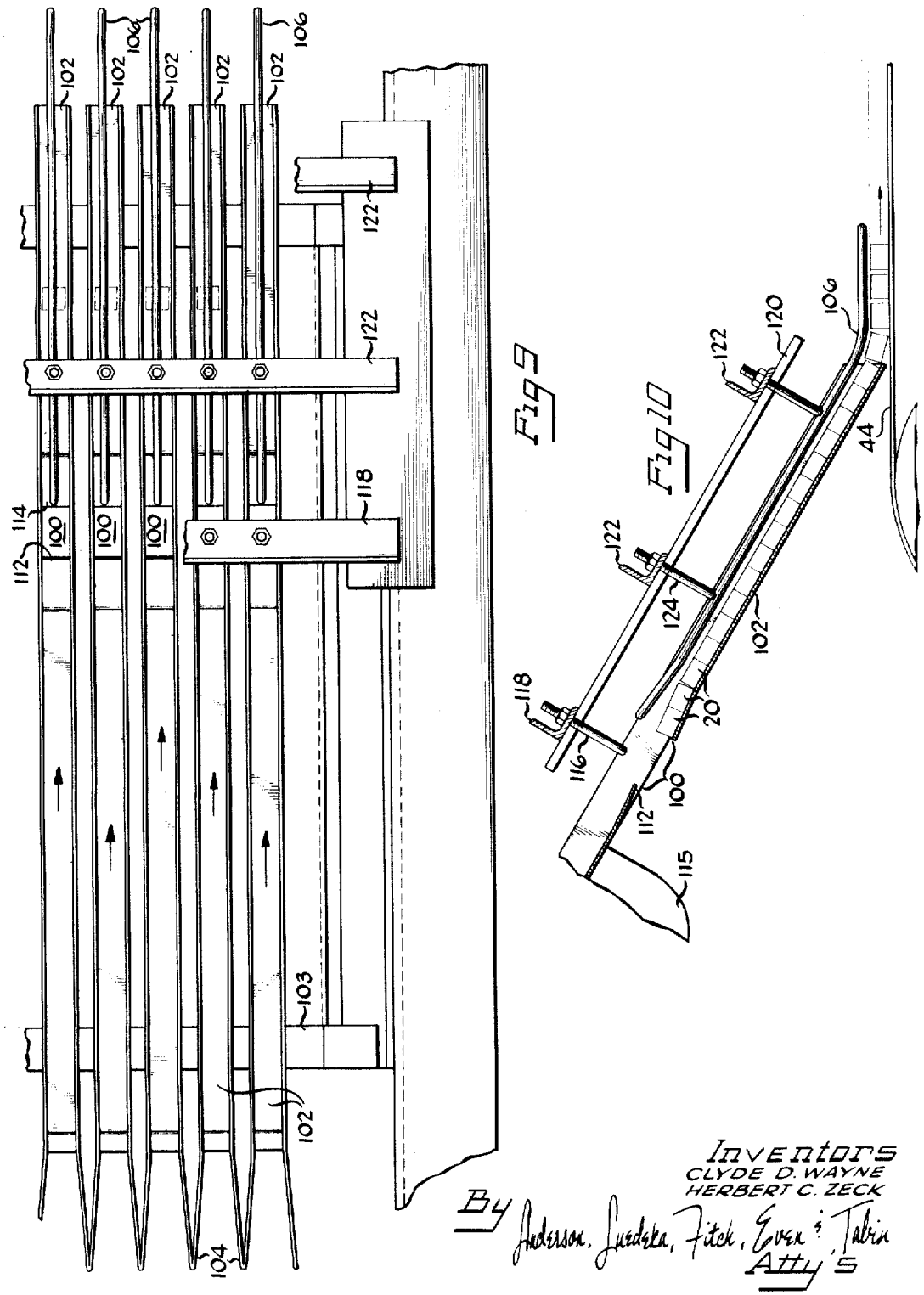

United States Patent Office 3,301,378
Patented Jan. 31, 1967

3,301,378
FOOD HANDLING APPARATUS
Clyde D. Wayne, Wilmette, and Herbert C. Zeck, Bellwood, Ill., assignors to National Dairy Products Corporation, Chicago, Ill., a corporation of Delaware
Filed Apr. 3, 1964, Ser. No. 357,254
13 Claims. (Cl. 198—33)

The present invention relates generally to apparatus for transferring a plurality of randomly disposed objects between two points and, more particularly, is directed to such apparatus as is capable of automatically effecting a uniform orientation of such objects during the transfer thereof.

In the processing or manufacture of certain products, it is frequently necessary for components thereof of certain shapes to be oriented in a particular manner prior to delivery to or entry into portions of the processing apparatus. Such a necessity arises, for example, in the production of candy in the form of blocks or centers of marshmallow, caramel, or other similar confectionary substances enrobed in chocolate or the like. Caramel centers, for example, are frequently in the form of non-cubical blocks having a pair of opposed generally square faces and four narrow edge faces. These centers are most stable when supported on one of their square faces and are preferably so oriented when fed into an enrober.

Caramel centers are extruded in the form of a long ribbon or rope which is then cut into blocks of the desired size. The blocks are delivered from the center former in random orientation. Also, the freshly cut surfaces of the blocks are generally tacky and, accordingly, are coated with starch prior to their transfer to the enrober to prevent them from adhering to one another. The centers remain randomly oriented when discharged from the starcher, Accordingly, it is necessary to orient the centers before delivering them to the enrober.

Previously, the orientation of the centers was accomplished manually by personnel who removed the centers from bins and placed them on a large oscillating grid positioned in overlying relation to a moving conveyor. As the centers were advanced by the conveyor and jostled by the grid, the personnel attempted to arrange them in proper orientation. Those centers which passed the personnel without being properly oriented were improperly enrobed and became waste. This technique was, therefore, not only time consuming and expensive in view of the number of personnel required, but was also not completely satisfactory.

Furthermore, the peripheral dimensions of the conveyor limited the number of persons who could gain access thereto for placement of the centers thereon. This limited number of persons were not capable of continuously placing the centers on the pan at a rate equal to the input capacity of the enrober. Hence, the arrangement of the centers on the conveyor had frequent voids, was less than 100% filled and, consequently, the enrober operated at less than full capacity, thus reducing the efficiency of the machine.

It is a principal object of the present invention to provide an improved apparatus for transferring randomly disposed objects between two points.

Another object of the present invention is to provide an apparatus which is capable of automatically effecting uniform orientation of randomly disposed objects during the movement thereof between two points.

A further object of the present invention is to provide an improved apparatus for transferring objects to a given point in a continuous maximum density flow.

A more specific object of the present invention is the provision of an improved apparatus for transferring objects of candy to a given point in a continuous maximum density flow and for automatically effecting uniform orientation of the objects during the movement from one point to the given point.

Other objects and advantages of the present invention will become apparent with reference to the following description and the accompanying drawings, wherein:

FIGURE 3 is an enlarged fragmentary plan view of a portion of the apparatus of FIGURES 1 and 2;

FIGURE 4 is an enlarged fragmentary perspective view of a portion of the apparatus of FIGURES 1 and 2 illustrating a manner of operation thereof;

FIGURE 5 is an enlarged fragmentary side elevational view of a portion of the apparatus of FIGURES 1 and 2;

FIGURE 9 is an enlarged fragmentary plan view of a portion of the apparatus of FIGURES 1 and 2;

FIGURE 10 is an enlarged fragmentary side elevational view of a portion of the apparatus shown in FIGURE 9.

Figure 1:
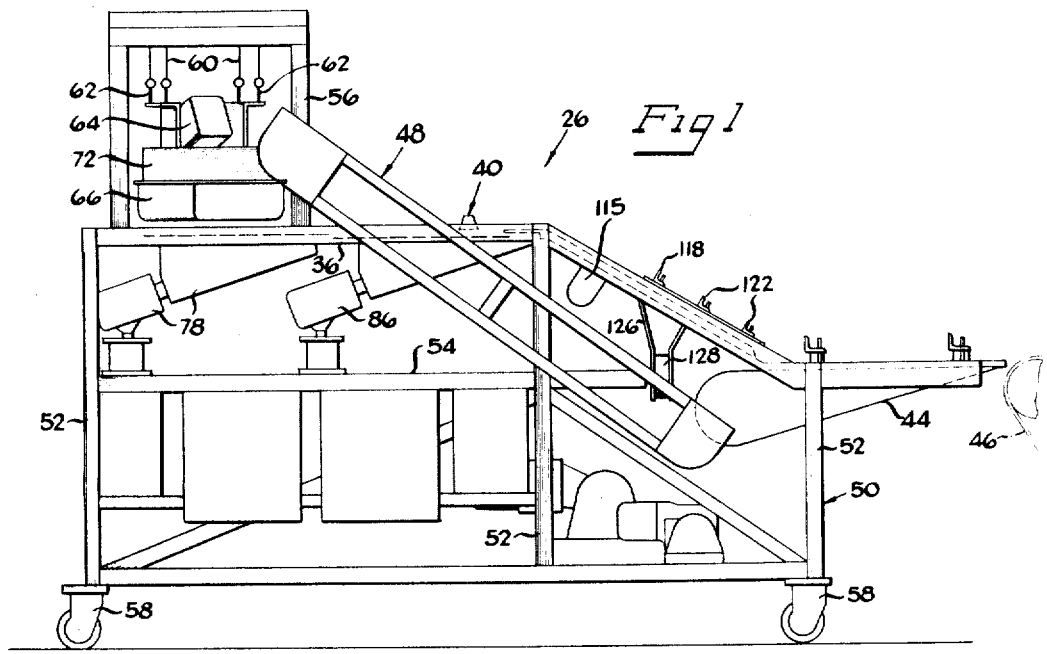
FIGURE 1 is an elevational view of an apparatus showing various of the features of the invention.

While the present invention has various applications in the transfer of objects, the apparatus illustrated in the drawings showing various of the features of the invention is directed particularly to the handling of centers for coated or enrobed candy and, more specifically, to the delivery of such centers to an enrober. Accordingly, the following description is directed to a specific embodiment of the invention as it is utilized in such an application. However, it is to be understood while the following description relates principally to the candy making art, it can be utilized in other instances of which the following is merely illustrative.

Figure 8:
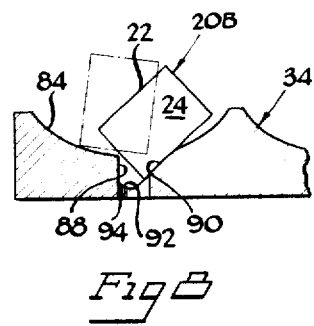
FIGURE 8 is a fragmentary sectional elevational view taken generally along line 8—8 of FIGURE 7.

More specifically, the candy centers which are to be transported by the apparatus of the illustrated embodiment of the invention, as seen best in FIGURES 4 and 8, are in the form of non-cubical blocks 20, each face of which is of a rectangular configuration. The illustrated blocks include a pair of opposed faces 22 of generally square configuration and two pair of edge faces 24 which have a length equal to a dimension of the square face but which are somewhat narrower than any dimension of the square face. A center thus may have a face 22 which is 3/4 inches square and edge faces of width of 3/8 to 1/2 inches. The blocks shown and the dimensions given are merely illustrative, and the apparatus can, of course, be utilized with blocks of other dimensions and configurations.

Referring to the blocks 20, it will be seen that they are most stable when supported on a face 22 and that they are less stable when supported on an edge face 24. When the blocks are candy centers, as in the illustrated embodiment, which are to be enrobed in chocolate or the like, it is desirable that they be delivered to the enrober in a uniform and, preferably, their most stable orientation, i.e., supported on a face 22.

Accordingly, an apparatus 26 (FIGS. 1 and 2) is provided which is adapted to receive a plurality of centers in random orientation from a starcher (not shown), initially orient the centers so that their faces 22 and 24 are either parallel or transverse to the general direction of movement thereof, and then further orient some of the centers so that all are supported on a face 22. More specifically, some of the centers are initially oriented with their square faces 22 facing forwardly (i.e., in the direction of movement) and rearwardly, and with a pair of their edge faces facing laterally as, for example, the center 20A in FIGURE 4, while others are disposed with their square faces 22 facing laterally and with a pair of their edge faces 24 facing forwardly and rearwardly as, for example, the center 20B in FIGURE 4. The apparatus then progressively tips the centers 20A forwardly or rearwardly and the centers 20B laterally so that all of the centers are disposed with their square faces 22 horizontal as, for example, the center 20C. Such orientation is accomplished prior to the arrival of the centers at the enrober (not shown).

The apparatus 26 also is adapted to insure a continuous flow of the centers to the enrober in a manner which insures the full capacity operation of the enrober, as will hereinafter be described.

Very generally, the apparatus 26 comprises (FIGS. 1 and 2) an infeeder 28 which receives a plurality of randomly oriented centers 20 from a supply conveyor 30 and distributes same onto a first vibrator pan 32. The first vibrator pan 32 effects initial orientation of the centers, as previously explained, and advances the centers toward and onto a second vibrator pan 34 which is disposed at a level below the pan 32 so as to provide a step 36 therebetween which causes centers disposed such as the center 20A to be tipped forwardly into the desired orientation supported on a face 22. The second vibrator pan 34 is provided with recesses 38 which cause centers disposed such as the center 20B to be tipped laterally into a position supported on a face 22. An orienting member in the form of a brush 40 overhangs the second pan 34 to engage and tip rearwardly a very small percentage of centers disposed such as the center 20A which are not oriented by the step 36.

After leaving the second vibrator pan 34, the centers enter a chute 42 which guides them onto an exit conveyor 44 leading to an infeeder conveyor 46 of the enrober (not shown). The chute 42 operates in conjunction with a recirculator system 48, as well as with various other portions of the apparatus, to insure a continuous flow of centers to the enrober at a rate and in a manner which insures the full capacity operation of the enrober.

More specifically, the apparatus 26 includes an elongated rectangular frame 50 having vertical posts or uprights 52 (FIG. 1) and horizontal cross bars 54 which support various of the components of the apparatus. At the left end of the apparatus, as viewed in FIGURES 1 and 2 (hereinafter referred to as the input or rearward end of the apparatus), the frame defines a superstructure 56 from which is suspended the infeeder 28, as hereinafter set forth. The frame 50 is shown as being mounted on coasters 58 to render it mobile, but it may of course, be constructed so as to be stationary if desired.

Figure 2:
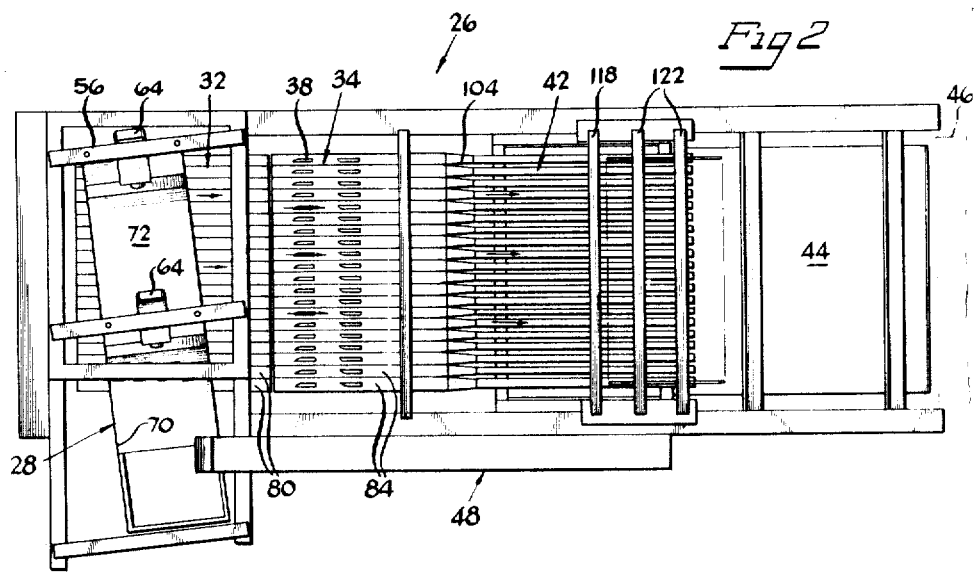
FIGURE 2 is a plan view of the apparatus of FIGURE 1.
Figure 6:
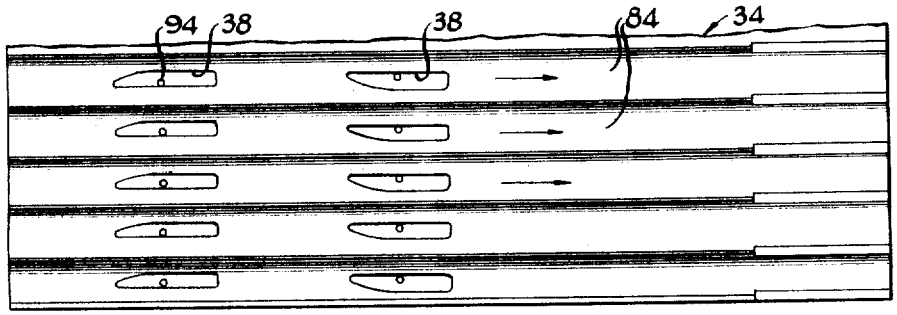
FIGURE 6 is an enlarged fragmentary plan view of a portion of the apparatus of FIGURES 1 and 2.

The infeeder structure 28 is suspended from the superstructure 56 by eye-bolts 60 which extend downwardly from the cross members of the superstructure to receive hooks 62 connected to vibrators 64 which are, in turn, connected to an elongated tray 66. The tray 66 is thus suspended for vibratory movement above the first conveyor pan 32 by the above arrangement, and is disposed slightly askew of a transverse position relative to the pan 32, as can be seen in FIGURES 2 and 3. The tray is longer than the width of the pan 32 and an end of the tray, hereinafter referred to as the outer end, extends past and overhangs a side edge of the pan.

The tray 66 is adapted to received centers in random orientation from a supply source (not shown) via the supply conveyor 30 which is positioned adjacent the outer end of the tray in slightly elevated relation thereto. The tray also receives randomly oriented centers from the recirculator 48, a portion of which is similarly positioned with respect to the tray. The conveyors from both the supply conveyor and the recirculator deposit centers at or adjacent to the outer end of the tray.

It is desirable that centers from the tray be distributed as uniformly as possible over the surface of the pan 32 and, in this regard, the tray 66 includes a flat bottom wall 68, and upwardly extending side walls 70 (FIG. 11) which are of a sufficient height to enable the tray to accommodate relatively large quantities of centers. A hood 72 may be provided to cover the pan if desired. That portion of the tray which overhangs the pan 32 is provided with a relatively wide slot 74 which extends diagonally of the tray, i.e., at an acute angle to the longitudinal axis thereof, with an edge 76 of the slot nearest the outer end of the tray spanning the pan 32 in a transverse but slightly forwardly inclined direction. Hence, although the tray 66 is narrower than the pan 32, the edge 76 is coextensive with the pan in a transverse direction.

The tray 66 is vibrated so as to cause centers deposited at the outer end thereof to move longitudinally of the tray toward the slot 74. Because of the disposition of the slot, the centers will arrive at the edge 76 after traveling greater or lesser distances toward the opposite edge of the pan 32, depending upon their disposition relative to the longitudinal centerline of the tray and, hence, will be essentially uniformly distributed over the pan 32. This factor greatly contributes to the ability of the apparatus to provide the enrober with a full capacity supply, as will be explained in detail shortly. If desired, the pan 32 may be vibrated at a slightly faster rate than the tray 66 so as to effect a slightly greater spacing between centers on the pan 32 than on the tray 66 where, on the tray 66, the centers may be quite closely spaced.

The first vibrator pan 32, shown generally in FIGURES 2 and 3, and somewhat more specifically in FIGURE 4, comprises a flat horizontally disposed plate supported on a vibrator unit 78 which induces vibrations in the pan sufficient to cause movement of the centers forwardly, as indicated by the arrows in the drawings. Additional support for the pan 32 may be provided in the form of a finger or rod (not shown) extending upwardly from the frame 50 for engagement with the pan in a manner which will provide support for the pan but will not dampen its vibrations.

The upper surface of the plate of the pan 32 is fluted to provide a plurality of longitudinally, i.e., rearwardly to forwardly, extending grooves or channels 80. In the illustrated embodiment, twenty such channels are provided but, of course, the number may vary as circumstances dictate. The bottom surface of each channel is defined by a bottom wall curved upwardly in opposite directions from a lower center portion to elevated narrow edges 82 which separate adjacent channels.

The centers 20 are dropped from the infeeder tray 66 through the slot 74 onto the rear end portion of the pan 32 in a generally even distribution among the channels 78 but randomly oriented. However, the vibratory movement of the pan, coupled with the curved configuration of the bottom walls of the channels 80, causes an initial orientation of the centers within the channels, as previously mentioned, wherein all of the faces of the centers are caused to become arranged either parallel to or transversely of the longitudinal axis of the channels and, hence of the general direction of movement of the centers.

The second vibrator pan 34 is similar in construction to the first vibrator pan 32 in that it is in the form of a flat plate provided with channels 84 corresponding to the channels 80 of the pan 32. Also, the pan 34, like the pan 32, is supported on a vibrator unit 86 which induces vibrations in the pan such as to cause forward movement of centers disposed on the pan. The second pan 34 preferably operates at a slightly faster speed than does the first pan 32 to ensure sufficient spacing between the centers on the second pan and to separate any centers which may have been moving in closely adjacent relation to one another on the first pan.

The second pan 34 is positioned in alignment with the first pan 32 immediately adjacent the forward end thereof but is spaced slightly from the pan 32 by a short gap which, in the illustrated embodiment is approximately ¼ inch. Also, the second pan is placed at an elevation slightly below that of the pan 32 so as to provide the step 36 previously referred to. In the illustrated embodiment, the elevational differential at the step 36 is ¼ inch or approximately one-half the thickness of a center 20.

As illustrated in FIGURE 4, centers which reach the step 36 with their large faces 22 in an upright transverse position (20A) are toppled forwardly onto the pan 34 so as to then rest on one of their large faces 22. This toppling is, of course, achieved in part by the vibratory action of the pan 32 which moves the candy center toward and off the step. If the upright center is disposed in a position wherein its large face 22 is disposed parallel to the longitudinal axis of the pans (20B), it will not ordinarily topple forwardly but will merely move over the step from pan 32 to pan 34, and its repositioning is achieved subsequently by the recesses 38, as explained in further detail shortly.

Figure 7:
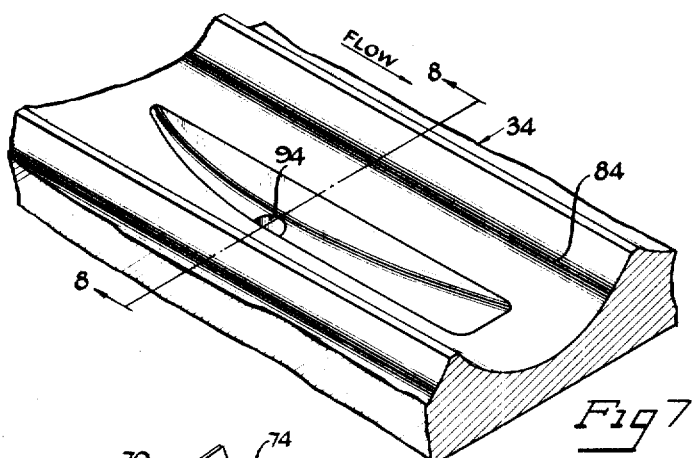
FIGURE 7 is an enlarged fragmentary perspective view of a portion of the apparatus of FIGURE 6.

In order to effect reorientation of forwardly advancing centers 20B in the pan 34, i.e., centers disposed with their faces 22 parallel to the longitudinal axis of the channel, each of the illustrated channels 84 in the second directional vibrator pan 34 is provided with a pair of the longitudinally spaced recesses 38 which function to laterally tilt or topple the centers positioned as at 20B onto a large face 22, as shown in FIGURE 8. Each recess 38 has a generally vertical wall 88, and an inclined wall 90 which merges with the vertical wall 88 to form a curved base 92 (FIG. 8). At the bottom of each recess 38, the pan 34 is provided with a small cylindrical hole 94 to prevent crumbs or what is known as "fines" from filling the recesses 38 and thus impairing their efficiency. The formed recess is narrowed at its rearward end, i.e., the end first engaged by the advancing center (FIG. 7), and is of a maximum depth slightly rearwardly of its longitudinal center but slopes upwardly toward each of its forward and rearward ends, the slope at the forward end being more gradual than at the rearward end.

The recesses 38 are positioned in the channels so as to be generally parallel to the longitudinal axis of the respective channels. Each is positioned slightly to one side of the longitudinal centerline of the channel, with the recesses of each pair being positioned on opposite sides of the centerline from one another. Hence, a center 20 will topple into a recess even though it is advancing in a path slightly offset from the centerline.

Thus, the recesses 38 of the pan 34 and the step 36 between the pans 32 and 34 effect reorientation of the caramel centers 20 which move along the pans with their large faces 22 upright and facing in either a longitudinal or a transverse direction.

While the step 36 is effective in toppling the centers from the position 20A, i.e., with its face 22 facing forwardly, it is possible that occasional centers so oriented, perhaps one percent of the overall flow, will pass over the step 36 and be advanced onto the pan 34 without being toppled. Also, it is unlikely that such a center will be toppled by the recesses 38. Hence, the brush 40 is provided and is positioned above the pan 34 so that it will be engaged by any centers which reach it in such an upright position and tip them rearwardly. The brush 40 is connected to and extends downwardly from a transverse bar 96 as shown in FIGURES 1 and 2, supported above the pan 34 by a pair of side support blocks 98 mounted on the frame 50.

Theoretically, in the operation of the apparatus, if the infeeder 28 distributes centers 20 uniformly on the pan 32, i.e., centers are deposited by the infeeder 28 in each of the channels at a uniform and constant rate, the centers could pass directly from the pan 34 to the enrober and, theoretically, the rate of infeed to the pan 32 would need to be only as great as the infeed rate of the enrober.

However, over a given period of time, one channel 80 of the pan 32 and, hence, a channel 84 of the pan 34, may receive considerably fewer centers than average due to a deviation in the operation of the infeeder, or may discharge considerably fewer centers than average due, for example, to a delay in the movement of centers in one channel of the pans 32 and 34. Hence, in a short period of time, one channel might be unable to supply centers to the enrober, thus decreasing the efficiency of the enrober.

In the illustrated embodiment, this problem is overcome by regulating the rate at which the centers are fed by the pans 32 and 34, and by the provision of the chute 42 and recirculator 48. Very generally, the centers are caused to flow toward and onto the chute 42 at a rate which is greater than the input rate of the enrober and, hence, greater than the rate at which the centers are removed from the exit end of the chute. Hence, there is a tendency for the centers to build up in the chute. However, the chute is provided with a plurality of drop-through apertures 100 which cause centers in excess of a predetermined number to be removed from the chute and to be placed on the recircular conveyor 48 which returns them to the infeeder tray 28, as previously mentioned.

More particularly, the chute 42 lies in a plane inclined at an angle of about 30° to the horizontal, with one of the ends of the chute disposed immediately adjacent the forward end of the pan 34 and with the other of its ends disposed below and forwardly of the pan 34 immediately adjacent the upper horizontal surface of the exit conveyor 44. The chute is defined by a plurality of U-shaped troughs 102 interconnected by cross members 103 supported on the frame 50. It is disposed relative to the pan 34 such that the troughs 102 are in alignment with the channels 84 of the pan 34, and is provided at its rearward end with diverging deflectors 104 which direct centers advancing along the pan 34 into one of the troughs of the chute. The centers are allowed to build up in the troughs and are prevented from buckling and tumbling outwardly therefrom by an overlying guide bar 106, described in greater detail shortly.

Referring to FIGURES 9 and 10 of the drawing, a drop-through opening 100 is provided in the base wall of each of the troughs 102 of the chute adjacent the upper end thereof. Each opening or aperture is in the form of an elongated rectangular slot somewhat wider than one of the centers and appreciably longer than one of the centers as measured along the longitudinal axis of the trough. A rearward or upper lip 112 of the slot is turned upwardly slightly (FIG. 10) so as to facilitate the movement of a center over the slot when the trough is not filled, while a lower lip 114 of the slot is turned downwardly slightly to catch a center skipping over the slot. It has been found that the centers skip over the drop-through opening when the length of the aperture is as much as 1¾ inches, i.e., almost twice the width of a center which is dimensioned as previously set forth.

Accordingly, the centers 20 in a trough 102 will move across the opening 100 so long as such movement is unobstructed. However, when the build up in the trough extends up the trough to the lower lip 114 (FIG. 10), the next center coming down the trough will abut the rear end of the stack of centers and drop back through the aperture.

In order to insure the desired movement of the centers down the chute 42, a vibrator 115 is secured to the lower surface thereof and induces vibrations in the chute. These vibrations facilitate the downward movement of the centers in the chute, and also prevent several centers from combining to bridge the drop-through opening 100.

In the event that a center should pass over both pans 32 and 34 and by-pass the brush 40 while still in an upright position, a situation that occurs relatively infrequently, a positive contact vertical finger 116 is provided above each drop-through aperture or opening 100 to engage such a center and prevent it from proceeding down the chute. The fingers 116 are constructed and positioned, however, to permit passage thereby of centers that are in a flat position (20C). The fingers are supported by a cross bar 118 which extends transversely of the chute and is supported thereabove by side supports 120.

Also carried by the supports 120 are a pair of cross bars 122 which have depending therefrom rods 124 to the lower ends of which are attached the guide rods 106. The rods 106 are elongated in shape, bent upwardly slightly at their upper ends to clear an incoming center, and bent upwardly also at their lower ends so as to extend forwardly a short distance beyond their associated trough in overhanging relation to the exit conveyor belt 44. Each rod 106 is spaced far enough from the floor of the associated trough 102 to allow free passage of the centers therealong in their flat or level position, but to prevent the centers from returning to an upright position, as, for example, by a buckling action of a stack of the centers.

Figure 11:
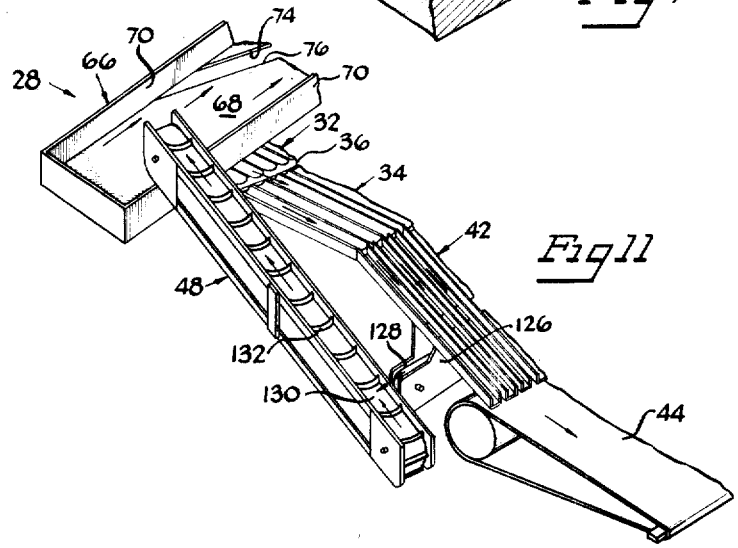
FIGURE 11 is a diagrammatic perspective view showing the arrangement of portions of the apparatus of FIGURES 1 and 2.

As shown in FIGURES 1 and 11, the centers 20 which fall through the drop through apertures 100 are guided by a pair of transversely disposed generally vertical baffle plates 126 to a narrow transversely moving conveyor belt 128 which carries them to the lower end of an inclined recirculation conveyor 130. The inclined conveyor 130 operates to carry the centers upwardly as indicated by the arrow and to deposit them on the rear end of the tray 66, as previously mentioned. The conveyor 130 includes a belt 131 provided with incrementally spaced transverse ribs 132 which assist in moving the centers upwardly.

Caramel centers are continuously moved through the illustrated apparatus 26 by the pans 32 and 34 and are recirculated as necessary so as to maintain some centers in each trough 102 at all times for feeding onto the conveyors 44 and 46 leading to the enrobing equipment. These conveyors move the centers at a selected rate, while the faster movement of the centers by the pans and the recirculating means ensures that all spaces on the conveyors to the enrobing equipment will be occupied for high efficiency and economical operation.

Thus, an improved apparatus is provided which automatically repositions or reorients a continuous flow of candy centers and also serves to maintain the supply conveyor to the enrobing equipment in saturated condition to thereby provide maximum efficiency of operation of the enrobing equipment.

While one specific embodiment of an apparatus showing various of the features of the invention has become illustrated and described it should be clear that modification and changes may be made therein without departing from the scope of the invention.

What is claimed is:

1. An apparatus for transporting a plurality of randomly oriented multi-sided objects from one station to another and for arranging the objects in uniform orientation, said objects being stable when supported on a first side thereof but being less stable when supported on a second side thereof, said apparatus comprising means defining a generally horizontally disposed surface for supporting objects being advanced therealong, said surface being provided with means for confining the advancing movement of the objects to a generally defined path, means for causing said surface to be moved so as to cause the objects supported thereon to be conveyed from adjacent one edge of said surface toward the opposite edge, and means associated with said moving surface for causing an object supported on a second side to be reoriented so as to be supported on a first side, said means comprising means defining a recess in said generally defined path for causing an object supported on a second side and advancing along said generally defined path to topple so as to be caused to fall onto a first side thereof.

2. An apparatus for transporting a plurality of randomly oriented multi-sided objects from one station to another and for arranging the objects in uniform orientation, said objects being stable when supported on a first side thereof but being less stable when supported on a second side thereof, said apparatus comprising a vibrator pan adapted to support the objects and operable to advance same relative to the pan in a predetermined direction from adjacent one end of said pan to the other, said vibrator pan having a surface defining a guide channel extending from adjacent one end of said pan to adjacent said other end and being adapted to receive therein a plurality of objects for movement therealong, said channel being provided with a recess for causing an object supported on a second side thereof and advancing along said channel to topple so as to be caused to fall onto a first side.

3. An apparatus for transporting a plurality of randomly oriented multi-sided objects from one station to another and for arranging the objects in uniform orientation, said objects being stable when supported on a first side thereof but being less stable when supported on a second side thereof, said apparatus comprising a vibrator pan adapted to support the objects and operable to advance same relative to the pan in a predetermined direction from adjacent one end of said pan to the other, said vibrator pan having a surface defining a guide channel extending from adjacent one end of said pan to adjacent said other end and being adapted to receive therein a plurality of objects for movement therealong, said channel being provided with an elongated recess extending longitudinally thereof for causing objects supported on one of the second pair of faces with one of the first pair of faces facing transversely of said direction of movement of said object to topple laterally so as to be supported on one of the first pair of faces.

4. An apparatus according to claim 2 wherein said channel is provided with a pair of recesses located adjacent opposite sides of said generally defined path so as to be engaged by objects disposed predominantly toward any side of the said path.

5. An apparatus for transporting a plurality of randomly orientated non-cubical blocks from one station to another and for arranging the blocks in uniform orientation, each of said blocks having a first pair of opposing somewhat square faces of relatively large surface area, the blocks being stable when supported on one of such faces, and having two pair of narrow rectangular edge faces of a width somewhat less than that of one of the first pair of faces, the block being less stable when supported on one of such edge faces, said apparatus comprising means defining first and second generally horizontal surfaces disposed adjacent one another for supporting the blocks, means for causing said surfaces to be moved so as to cause the blocks on said first surface to be advanced toward and onto said second surface, the edge of said second surface adjacent to said first surface being disposed at a level lower than the adjacent edge of said first surface so as to cause blocks approaching said second surface supported on one of the edge faces and with one of said first pair of faces facing said second surface to topple toward said second surface so as to be supported on one of the first pair of faces, said second surface being provided with a guide channel extending from adjacent one end thereof to adjacent the other end and being adapted to receive therein a plurality of the blocks for movement therealong, said channel being provided with a recess for causing a block supported on an edge face with its first pair of faces facing transversely of said channel to topple so as to be caused to fall in a lateral direction onto one of the first pair of faces.

6. An apparatus for distributing a plurality of objects in rows, said apparatus comprising a first generally horizontally disposed narrow directional vibrator pan adapted to receive randomly arranged objects thereon and operable to continuously move the objects in a first direction lengthwise of said pan from adjacent one end thereof toward the opposite end, said first pan including an edge extending diagonally thereacross adjacent said opposite end of said pan, an elongated second generally horizontally disposed directional vibrator pan wider than said first pan disposed below said edge and positioned relative to said edge so that the objects continuously fall onto said second pan, said second pan having a width approximately the length of said edge and being arranged generally transversely of said edge.

7. Apparatus for delivering a maximum density supply of objects to a given point at a selected flow rate, said apparatus comprising a carrier adapted to receive objects thereon and operable to continuously move at least two columns of the objects in a predetermined forward direction at a rate faster than the selected rate, a chute disposed in line with and forwardly of said first carrier, said chute extending downwardly from said carrier and adapted to receive the columns of objects from said carrier, means for removing the objects from the chute at the selected rate, whereby the objects in each column of the chute tend to accumulate in a stack in said chute, means defining a fall-through opening in said chute in the path of each column of objects, adapted to prevent the number of objects in the stack from exceeding a predetermined amount, and means positioned below said opening for returning the objects which fall through same to said carrier.

8. An apparatus for transporting a plurality of randomly oriented multi-sided objects between a first point and a second point, automatically reorienting the objects during the movement thereof, and providing a full density supply of the objects at a selected rate at said second point, the objects each having a first pair of opposed sides and edge surfaces extending therearound of a lesser area than said first sides, said object being stable when supported on said first sides but being less stable on one of said edge sides, said apparatus comprising a first carrier and repositioning means including a generally horizontal surface for supporting the objects, said means being operable to continuously move the objects in at least two columns in a determined forward direction at a rate faster than the selected rate at which the objects are used, said means defining a ledge in the support surface extending transversely of said direction of movement across the path of the columns of objects to cause each object disposed with its large surfaces upright and generally transverse to said direction to tilt forwardly onto its forwardmost large surface incident to its movement past said ledge, said means also defining a recess at either side of the path of each column of objects to cause each object disposed with its large surfaces upright and generally aligned with said direction to tilt to one side or the other onto one of its large surfaces incident to its movement past one of said recesses, a chute arrangement disposed in line with and forwardly of said first carrier means, said chute arrangement extending downwardly from said carrier means and adapted to receive the columns of objects from said carrier means, a second carrier means disposed in line with and forwardly of said chute arrangement to receive the columns of objects from said chute arrangement at the selected rate, whereby the objects in each column tend to accumulate in a stack in said chute arrangement, means defining a fall-through opening in said chute arrangement in the path of each column of objects, said openings being positioned to limit the stacks of objects, and means positioned below said openings for returning the objects which fall through said openings to said first carrier means.

9. A method of transferring randomly oriented multi-face objects from one point to another and for effecting uniform orientation of the objects incident to the movement thereof, which method comprises effecting an initial orientation of the objects such that given faces thereof are disposed parallel to and transversely of the direction of travel of the objects, further orienting those objects having their given faces disposed upright by advancing such objects over an edge defining a surface area disposed at a level below that supporting the objects immediately prior to arriving at such edge.

10. An apparatus for relocating objects comprising means defining a first surface having opposite ends and being adapted to support a plurality of objects, said surface terminating adjacent one end in an edge extending diagonally to a given axis of said surface, means moving said first surface so as to cause objects supported thereon to be advanced toward said one edge in a direction generally parallel to said given axis, means defining a second surface underlying said first surface coextensive with said one edge effective to receive objects advancing past said one edge for distribution across said second surface, and means moving said second surface so as to cause objects supported thereon to be advanced in a direction generally transverse to said one edge and to said given axis of said first surface.

11. An apparatus for transporting a plurality of multi-sided randomly oriented blocks of substantially identical size from a first station to a second and for arranging the blocks in uniform orientation prior to their arrival at the second station, said apparatus comprising conveyor means extending between said first and second stations and having a surface for receiving and transporting the blocks, supply means at said first station defining a supporting surface above said conveyor means for supporting a plurality of blocks, means for causing blocks on said supporting surface of said supply means to fall freely at a given rate and in random orientation onto the receiving and transporting surface of said conveyor means, means for causing said conveyor means to effect advancing movement of the blocks away from said first station and toward said second station at a rate at least as great as the given rate at which the blocks fall onto said conveyor means so as to prevent a vertical buildup of blocks on said conveyor means at said first station, means spaced from said first station in the direction of advance of the blocks for initially orienting all of the advancing blocks on said conveyor means such that some of the sides thereof are disposed generally parallel to the direction of advance of the blocks and so that the remaining sides thereof are disposed generally transversely of the direction of advance of the blocks, and means associated with said conveyor means for further orienting some of the remaining advancing blocks so that each block is supported on one of a selected pair of given sides thereof.

12. An apparatus in accordance with claim 11 wherein one of said orienting means comprises a step defined by a first portion of said conveyor means located adjacent said first station and by a second portion of said conveyor means located adjacent said second station at an elevation below said first portion, said step being proportioned and arranged so as to permit essentially unsupported movement of unstable objects advancing from said first portion to said second portion to thereby cause such unstable objects to tumble into a stable condition when crossing said step.

13. An apparatus in accordance with claim 12 wherein said first portion of said conveyor means is defined by a first generally horizontally disposed directional vibrator pan adapted to support the objects and operable to advance same in a predetermined direction from adjacent one end of said pan to the other, said first vibrator pan having a surface defining a guide channel extending from adjacent one end of said pan to the other and adapted to receive a plurality of the objects for movement therealong, and wherein said second portion of said conveyor means is defined by a second generally horizontally disposed directional vibrator pan positioned with one of its ends adjacent said other end of said first vibrator pan adapted to receive objects from said first vibrator pan and operable to advance same in said predetermined direction from adjacent said one end of said pan to adjacent the other, said second vibrator pan having a surface defining a guide channel extending from adjacent said one end of said pan to adjacent said other end, said second pan being positioned with its channels in alignment with the channels of said first pan and being arranged with its one end at an elevation below that of said other end of said first pan so as to define said step.

References Cited by the Examiner

UNITED STATES PATENTS

| | | |
|---|---|---|
| 1,495,610 | 5/1924 | Paridon _____ 198—220 X |
| 1,972,489 | 9/1934 | Rideout et al. |
| 2,496,019 | 1/1950 | Peel. |
| 2,910,165 | 10/1959 | Byington. |
| 2,956,665 | 10/1960 | Arlin. |
| 3,068,989 | 12/1962 | Packman et al. |

SAMUEL F. COLEMAN, *Primary Examiner.*

EVON C. BLUNK, *Examiner.*

R. E. KRISHER, A. C. HODGSON,
*Assistant Examiners.*